United States Patent
Bartik et al.

(10) Patent No.: US 10,248,418 B2
(45) Date of Patent: *Apr. 2, 2019

(54) CLEARED MEMORY INDICATOR

(71) Applicant: International Business Machines Corporation, Armonk, NY (US)

(72) Inventors: Jane H. Bartik, Poughkeepsie, NY (US); Peter G. Sutton, Lagrangeville, NY (US); Craig R. Walters, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,760

(22) Filed: Jun. 30, 2015

(65) Prior Publication Data
US 2017/0003963 A1    Jan. 5, 2017

(51) Int. Cl.
*G06F 9/30* (2018.01)
*G06F 3/06* (2006.01)

(52) U.S. Cl.
CPC .......... *G06F 9/30043* (2013.01); *G06F 3/067* (2013.01); *G06F 3/0608* (2013.01); *G06F 3/0644* (2013.01)

(58) Field of Classification Search
None
See application file for complete search history.

(56) References Cited

U.S. PATENT DOCUMENTS

| | | | |
|---|---|---|---|
| 6,049,476 A | 4/2000 | Laudon et al. | |
| 6,393,513 B2 * | 5/2002 | Estakhri | G06F 13/1647 711/5 |
| 6,708,259 B1 * | 3/2004 | Wyland | G06F 13/1668 711/154 |
| 6,725,321 B1 | 4/2004 | Sinclair et al. | |
| 7,409,489 B2 | 8/2008 | Sinclair | |
| 7,437,653 B2 | 10/2008 | Gorobets | |
| 7,849,253 B2 | 12/2010 | Stewart | |
| 7,975,119 B2 * | 7/2011 | Erez | G06F 12/0246 711/166 |
| 8,239,619 B2 | 8/2012 | Hung et al. | |
| 8,255,616 B2 | 8/2012 | Scouller et al. | |
| 8,452,913 B2 | 5/2013 | Sudo | |

(Continued)

OTHER PUBLICATIONS

List of IBM Patents or Patent Applications Treated as Related, Appendix P.; 2 pages.

(Continued)

*Primary Examiner* — Reginald G Bragdon
*Assistant Examiner* — James J. Thomas
(74) *Attorney, Agent, or Firm* — Cantor Colburn LLP; William Kinnaman

(57) ABSTRACT

Aspects include a computer-implemented method for receiving an instruction at a processor, the instruction associated with a memory block having an address. A clear indicator that indicates whether the memory block is in a cleared state is assessed by the processor. The cleared state is a state of the memory block in which the memory block does not have any data stored therein. The method also includes determining based on the clear indicator whether the memory block is in the cleared state.

15 Claims, 5 Drawing Sheets

(56) References Cited

U.S. PATENT DOCUMENTS

| | | | |
|---|---|---|---|
| 2003/0154344 A1* | 8/2003 | Itoi | G06F 3/0608 |
| | | | 711/100 |
| 2010/0131699 A1* | 5/2010 | Luukkainen | G06F 12/0246 |
| | | | 711/103 |
| 2013/0166818 A1* | 6/2013 | Sela | G06F 12/0246 |
| | | | 711/103 |
| 2014/0040650 A1 | 2/2014 | Hida et al. | |
| 2016/0210060 A1* | 7/2016 | Dreyer | G06F 3/0613 |

OTHER PUBLICATIONS

Saxena, et al., "FlashVM: Virtual Memory Management on Flash", Proceedings of the 2010 USENIX Conference on USENIX Annual Technical Conference, USENIX Association, 2010, 14 pages.

U.S. Appl. No. 14/755,732, filed Jun. 30, 2015, Entitled: Memory State Indicator Check Operations, First Named Inventor: Pak-Kin Mak.

U.S. Appl. No. 14/755,747, filed Jun. 30, 2015, Entitled: Memory State Indicator, First Named Inventor: Jane H. Bartik; 30 pages.

U.S. Appl. No. 14/854,255, filed Sep. 14, 2015, Entitled: Cleared Memory Indicator, First Named Inventor: Jane H. Bartik.

Wang et al., "Undelete Message Function in Pager," Motorola, Inc., Technical Developments, Nov. 1995, pp. 117-119.

\* cited by examiner

CLEARED MEMORY INDICATOR

BACKGROUND

The present invention relates generally to managing memory by a computer processor, and more specifically, to determining whether blocks or regions of memory have been cleared.

In modern computer systems, memory use is accomplished by a limited set of algorithms that manage the use of memory blocks or sections. Such functions include pre-fetch functions and memory allocation functions that manage memory to select blocks that are available for storage in response to input of data to memory and/or requests of data from various devices (e.g., CPUs, virtual machines, control units, external devices or users, etc.). Memory management operations include assigning blocks of memory for use by a device, which typically requires clearing the blocks for use to ensure that data from previous usage is not stored therein. Each time the blocks are returned, the blocks are again cleared. In some instances, if blocks were not completely used, a portion of the assigned blocks already exists in a cleared state. In such instances, an effective double clearing is performed that can result in unnecessary use of time and processing resources.

SUMMARY

In one embodiment, a computer-implemented method includes receiving an instruction at a processor, the instruction associated with a memory block having an address, and accessing a clear indicator by the processor, the clear indicator indicating whether the memory block is in a cleared state. The cleared state is a state of the memory block in which the memory block does not have any data stored therein. The method also includes determining based on the clear indicator whether the memory block is in the cleared state.

In another embodiment, a system includes a memory having computer readable instructions, and one or more processing devices for executing the computer readable instructions. The computer readable instructions include receiving an instruction associated with a memory block having an address, and accessing a clear indicator by the processor, the clear indicator indicating whether the memory block is in a cleared state. The cleared state is a state of the memory block in which the memory block does not have any data stored therein. The instructions also include determining based on the clear indicator whether the memory block is in the cleared state.

In a further embodiment, a computer program product includes a computer readable storage medium having program instructions embodied therewith, the program instructions executable by a processing device to cause the processing device to perform a method. The method includes receiving an instruction at a processor, the instruction associated with a memory block having an address, and accessing a clear indicator by the processor, the clear indicator indicating whether the memory block is in a cleared state. The cleared state is a state of the memory block in which the memory block does not have any data stored therein. The method also includes determining based on the clear indicator whether the memory block is in the cleared state.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Various embodiments of methods, systems and computer program products are provided for accessing and managing memory located in or accessible by a processor and/or computer system. Embodiments employ techniques that use knowledge or information regarding whether a memory block or area is in a cleared state. For example, program accessible state information is provided for blocks of memory to indicate whether one or more blocks have been cleared (i.e., set to some state to delete customer data, cleared to all zeroes, or otherwise having no data stored therein). A computer or processor (hardware or software), such as a processing unit, program or operating system, can use knowledge of whether memory blocks have been cleared to avoid detailed inspection of the block, avoid re-clearing an already cleared block, and/or avoid other unnecessary and/or redundant system operations.

In one embodiment, a clear indicator is incorporated in a data structure stored in a storage location accessible to the processor so that the processor can check the clear indicator to determine whether a storage block is or has been cleared. Examples of data structures include metadata, addressing tables (e.g., cache tables or arrays, page tables, index tables and dedicated clear indicator tables or table entries), control register or data structure fields, encryption data, virtual machine or hypervisor data and others.

Figure 1:
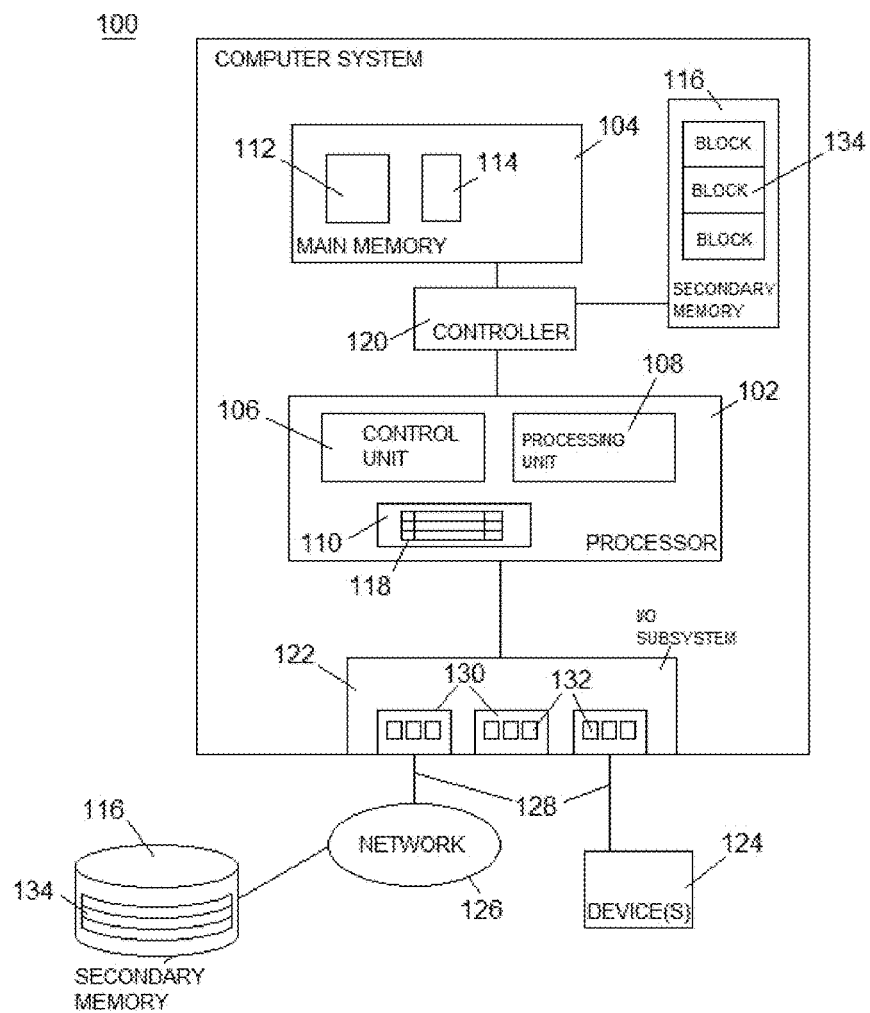
FIG. 1 depicts an embodiment of a computer system for processing and memory management.

FIG. 1 illustrates an embodiment of a computer system 100, which may be used to implement methods and processes described herein, such as a personal computer, workstation, minicomputer, mainframe computer, server and/or network. The system 100 includes a processor 102 (e.g., a microprocessor and/or multi-core processor) and a main memory 104. The processor 102 is a hardware device for executing hardware instructions or software, including those stored in main memory 104, and may be a custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processing unit 102 includes components such as a control unit 106, a processing unit 108 (e.g., an arithmetic logic unit) and a cache 110. Although the processor 102 is shown as a single processor 102, as described herein a processor may refer to multiple processors (e.g., a central processor complex (CPC)). Furthermore, the processor 102, the memory 104 and other components may be real or virtual, e.g., represented logically via a virtual machine.

Main memory 104 stores data and programs that are executed by the processor 102. Additional memory may be accessible to the processor 102 and other components of the system 100, such as internal and/or external secondary memory 116, such as a hard disk or database. As described herein, "memory" may refer to the main memory, any internal or external secondary and/or any other physical or virtual device or component that can store data and/or instructions. The memory (e.g., main memory 104 and secondary memory 116) may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory may incorporate electronic, magnetic, optical, or other types of storage media. Note that the memory may have a distributed architecture, where various components are situated remote from one another but may be accessed by the processor 102.

Instructions in memory 104 may include one or more separate programs, each of which includes an ordered listing of executable instructions for implementing logical functions. In the example of FIG. 1, the instructions in the memory 104 include one or more operating systems 112 and programs 114. As used herein, "operating system" (OS) refers to any computer program, software, interface or device that is responsible for the management of computer resources and executing instructions. An OS, such as OS 112 in FIG. 1, essentially may control the execution of other computer programs and provides scheduling, input-output control, file and data management, memory management, and communication control and related services.

The cache 110 stores data from the main memory 104 and/or the secondary memory 116 used by the CPU to execute programs, receive data and send data. The cache 110 may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 110 may be organized as a hierarchy of more cache levels (L1, L2, etc.). The cache 110 is divided into multiple cache lines 118 that contain, e.g., data fetched from main memory, tags indicting an address or location of the data in main memory, and flag bits. The cache lines may be stored and accessed as one or more cache arrays, e.g., a tag array and a data array.

Other components of the system 100 may include a memory controller 120 that may be incorporated in the processor 102 or as a separate circuit, other controllers such as a display controller, and interfaces to peripherals such as keyboards, a mouse and a display. An input/output (I/O) subsystem 122 facilitates transmission of data between the main memory 104 and/or secondary memory 116 and one or more I/O devices 124. The devices 124 may be internal to the computer system or external devices connected to the I/O subsystem 122 via any suitable connection, such as a network 126 (e.g., a local area network, fabric or the internet). The devices 124 may be any device or system that exchanges data with the main memory 104, such as clients, workstations, file servers, and peripherals such as printers, scanners, storage devices (e.g., external secondary storage 116) and output/display devices. Additional examples of devices 124 include card readers and punches, magnetic tape units, direct access storage devices, displays, keyboards, pointing devices, teleprocessing devices, communication controllers and sensor based equipment, to name a few.

In one embodiment, the I/O subsystem 122 is a channel subsystem, which uses one or more communication paths, such as channel paths 128 (or I/O channels) as the communication links in managing the flow of information to or from the devices 124. In one embodiment, the channel subsystem 122 includes one or more individual channels 130 that are each connected to one or more devices 124 via one or more channel paths 128. Each channel 130 includes processing electronics such as a local channel microprocessor and a local channel memory that is connected to and accessible by the local channel microprocessor. The local channel memory may include information such as a channel-program designation, a channel-path identifier, a device number, a device count, status indications, as well as information on path availability and functions pending or being performed. Also located within each channel 130 are one or more subchannels 132. Each subchannel 132 is a data structure located within a channel memory that provides information concerning an associated I/O device 124 and its attachment to the channel subsystem 122.

Modern computers typically manage memory as blocks or sections and utilize various schemes and techniques to manage access to various blocks and keep track of whether memory has been altered. For example, data may be stored in the main memory 104, secondary memory 116, caches 110 and other memory locations in fixed or variable size sections or blocks 134, which may take many forms. For example, memory may be divided into partitions (physical or logical), segments, pages and/or cache lines. Examples of memory blocks are described further below in conjunction with various embodiments and examples, but are not limited thereto. Memory blocks as described herein may be any type of memory partition or section used to divide a memory space, such as main memory, RAM, a cache, virtual memory and others, and is not limited to the specific embodiments described herein.

As of part memory management and general processing operations, clearing memory (e.g., setting memory to zero) is a common task. "Clearing" a memory block or amount of storage refers to setting the block to a zero state (also referred to herein as a "cleared state") in which the block has no customer data (or any other data that can be stored in the memory block) stored therein. For example, clearing a memory block includes setting all of the bits to zero, or to some other value indicating that no data is stored therein. "Cleared" memory refers to a memory block having or set to this state.

For example, when a processor sets up an amount of storage (referred to herein as a "memory space"), e.g., assigns memory pages or other types of memory blocks to a partition, the processor clears the memory space by setting the corresponding storage location values to zero.

In yet another example, a memory block may be part of memory in a server or disk that can be shared by multiple users. When memory is requested by a user, the processor typically selects a memory space including one or more blocks of memory and assigns that memory space to a user. When the user has finished using the assigned memory, it is returned to the system, and the memory space is cleared or set to zero.

In yet another example, a processor (e.g., a CPU) stores copies of data from frequently used memory locations in a cache, which is typically divided into memory blocks referred to as cache lines. When the processor clears a cache, it sets all or some of the cache lines to zero, i.e., it sets all of the bits in each cleared line to zero.

If any of the blocks or other parts of the memory space were already set to zero in the above examples, clearing those blocks would represent an effective double clearing, which would result in an unnecessary use of processing time and resources. For example, memory being set to zero in a conventional system is often already set to zero. For example, a user may receive 100 MB of memory initialized or set to zero, but only store data in 80 MB of memory. The remaining memory was never touched and so is still zero. When this 100 MB of memory is released by the user, the entire 100 MB of memory is set to zero in the conventional system, even though 20 MB of the memory is already zero.

In yet another example, a processor (e.g., a CPU) is accessing contiguous blocks of memory to encrypt the contents of each cache line prior to transmission to another computer system. Under normal application, this requires the processor to fetch each cache line individually, encrypt the data, and then proceed to access the subsequent cache line for encryption, and so on. In this example, the processor can determine upon accessing the first cache line if an associated clear indicator bit is active for a given memory block, and upon determining that said clear indicator is active, proceed with encrypting the existing data pattern for the remainder of the memory block size given that the clear indicator ensures that the memory block in its entirety is in a cleared state. In doing so, the clear indicator is used to avoid unnecessary fetches to the remainder of the memory block, expediting the encryption process without altering the results, and eliminating unnecessary system traffic.

Embodiments described herein prevent unnecessary use of resources by providing information to a processor that allows the processor to determine whether a block of memory is cleared or has already been cleared so that the processor does not have to clear that block. For example, an indicator (referred to herein as a "clear indicator") or other information is provided that is accessible to a processor such that the processor can determine that one or more blocks are already in a cleared state without having to inspect the contents of the blocks. The "contents" of a memory block, in one embodiment, are memory locations in the block at which customer data or other data can be stored (e.g., a memory block payload, as distinguished from metadata that may be stored with the memory block or elsewhere).

Techniques to determine if memory is already set to zero can include incorporating new data structures, existing data structures and/or additions to or extensions of existing data structures. For example, clear indicators can be incorporated into existing change control bits, new metadata, or existing virtual to real mapping techniques or new data added to existing virtual to real mapping techniques for the purpose of determining if memory is already set to zero.

A processing device or system, such as the system 100, includes information accessible by a processor (e.g., CPU, OS, controller, processing unit or module) to allow the processor to determine whether a block of memory has been cleared or set to zero. This information represents knowledge that all or a portion of some memory is already set to zero or in a cleared state. Various methods are described herein that improve memory clear performance by avoiding clearing memory using the knowledge that some or all of the memory being cleared is already set to zero or otherwise cleared. Any existing technique for memory allocation or management may be used, with the addition of using this knowledge or information to determine whether a memory space or block has been cleared prior to clearing that space or block. In addition, any processor instructions used to clear memory may be extended to include this information to improve performance by determining whether the memory being cleared or set to zero is already set to zero (in a cleared state).

In one embodiment, each memory block includes or is associated with a program accessible state that indicates whether the memory block has been cleared, i.e., at some state in which the memory block has no data stored therein and/or customer data or other data has been deleted (e.g., the block has been cleared to all zeroes or has not yet been used to store data). In one embodiment, an indicator is stored with or otherwise associated with each individual memory block to allow a processor managing the memory to determine whether the memory block has been cleared.

The clear indicator or information used by a processor or program may be embodied in any of various configurations. The clear indicator may be incorporated into any processor or program accessible data structure, including hardware and software structures. In one embodiment, the clear indicator may be included in metadata, control data structures and/or addressing data structures. For example, the clear indicator may be stored in the processor 102 as metadata received with instructions, fields in addressing tables, data structures in the channel subsystem 122, and/or metadata associated with memory blocks such as memory blocks 134 or cache lines 118. Non-limiting examples of the clear indicator and use of the clear indicator by a processor are discussed further below.

Figure 2:
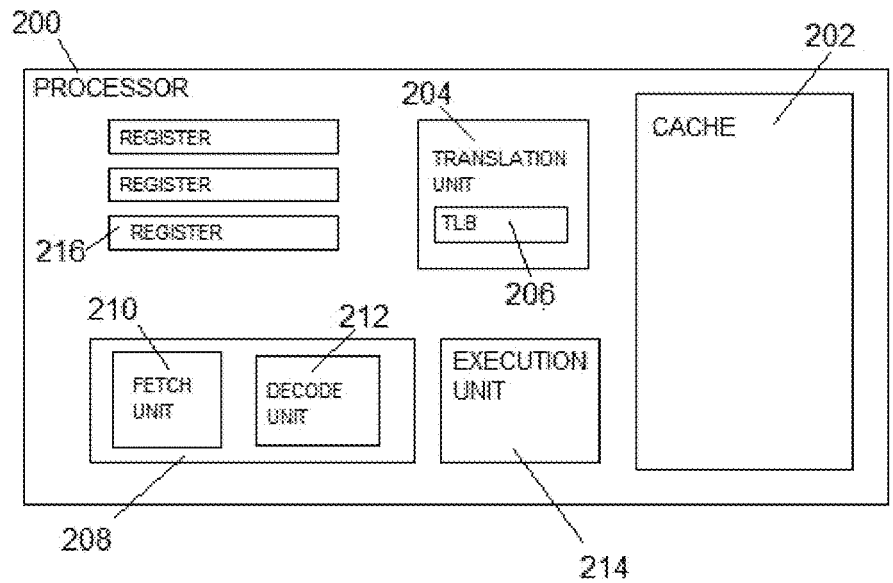
FIG. 2 depicts an embodiment of a processor including memory management and cleared memory monitoring and/or indication capabilities.

FIG. 2 shows an example of a processor 200 and components used by the processor 200 to perform processing and memory management functions. The processor may be configured as a CPU or other suitable type of processor, and performs functions including accessing and storing data and instructions in a memory (e.g., the main memory 104 and/or secondary memory 116) via a cache 202.

In this example, the processor 200 includes a translation unit 204 (e.g., a memory management unit) for transforming program addresses (e.g., virtual addresses) into real addresses of memory. The translation unit 204 includes a translation lookaside buffer (TLB) 206 for caching translations so that later access to an associated memory block does not require the delay of address translation. In one embodiment, data is fetched from memory by a control unit 208, which interacts with the cache 202 and includes storage and processing units such as a fetch unit 210 and a decode unit 212. The control unit 208 directs data to an execution unit 214. Multiple execution units may be included, such as an arithmetic execution unit, a floating point execution unit and a branch instruction execution unit. The control unit 208 may also be responsible for allocating memory to various users (e.g., external devices or virtual machines).

The translation unit 204 is used to translate between addresses used by the processor 200 and physical addresses. The TLB 206 is a hardware cache used by the translation unit 204 to store recently used entries of an address space table, e.g., a page table. For example, when a virtual address needs to be translated into a physical address, the TLB is searched first. If a match is found (a TLB hit), the physical address is returned and memory access can continue. However, if there is no match (called a TLB miss), the handler will typically look up the address mapping in the page table to see whether a mapping exists (a page walk). If one exists, it is written back to the TLB.

The processor 200 may include various storage components, including registers and caches that allow the processor 200 to perform various functions, such as instruction execution, configuration, storage and memory management functions.

The processor 200 communicates with a plurality of registers 216 during operation. An instruction operation code (opcode) determines which type of register is to be used in any particular machine instruction operation. For example, the processor 200 includes multiple general registers, status and control registers and memory block registers. General registers store information designated by instructions, and may be used as base address registers and index registers in address arithmetic and as accumulators in general arithmetic and logical operations.

Control registers provide for maintaining and manipulating control information, and are used to perform functions such as addressing and memory management functions. The bit positions in the registers are assigned to particular facilities in the system, such as program event recording, and are used either to specify that an operation can take place or to furnish special information required by the facility.

When the processor 200 wants to access and/or assign a memory block in main memory or a cache, the processor 200 and/or a processing unit therein (e.g., a memory management unit "MMU" or fetch unit) uses addresses stored in any suitable location, such as the cache 202, main memory or secondary memory. For example, the translation unit 204 accesses a list of addresses corresponding to blocks of memory or determines a virtual address and translates that virtual address into a corresponding real address. As discussed further below, the clear indicator may be stored as a flag or other field indication in an address, in an address table or in a dedicated list or table of clear indicators that can be accessed without directly accessing the corresponding memory block.

Addresses can be categorized in multiple ways. For example, addresses may be absolute, real, and virtual. The addresses are distinguished on the basis of the transformations that are applied to the address during a storage access. Address translation converts a virtual address to a real address. Prefixing converts a real address to an absolute address. In addition to the three basic address types, additional types are defined which are treated as one or another of the three basic types, depending on the instruction and the current mode.

An absolute address is the address assigned to a main storage location. An absolute address is used for a storage access without any transformations performed on it. All processing units and components in a configuration (e.g., the processor 102 and the channel subsystem 122 shown in FIG. 1) may refer to a shared main storage location by using the same absolute address. A real address identifies a location in real storage. When a real address is used for access to main storage, it is converted, by means of prefixing, to form an absolute address.

A virtual address identifies a location in virtual storage. When a virtual address is used for an access to main storage, it is translated by means of dynamic address translation, either to a real address which may be subject to prefixing to form an absolute address, or directly to an absolute address.

Figure 3:
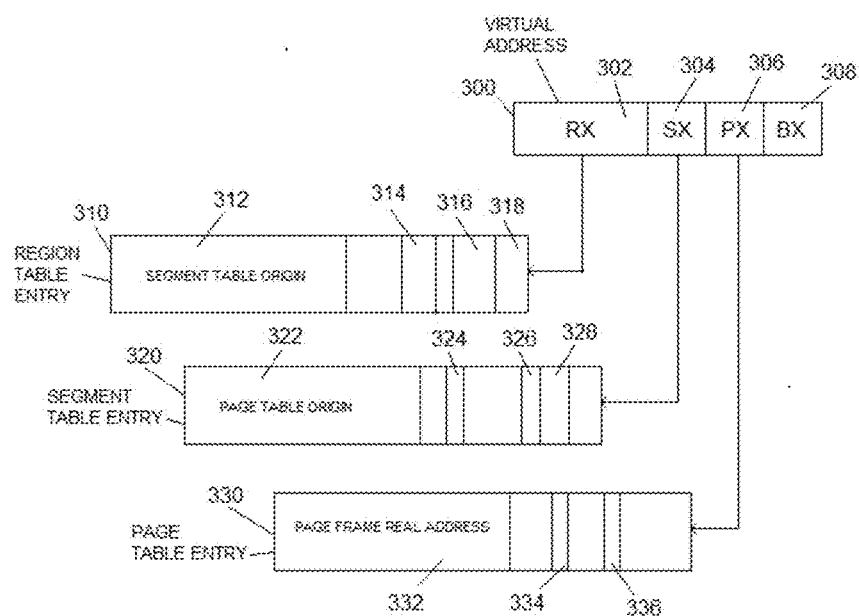
FIG. 3 depicts an embodiment of a virtual memory address and addressing tables used by a processor to access memory locations.

An example of a virtual address 300 is shown in FIG. 3. The virtual address 300 references a plurality of translation tables to obtain a real or absolute address. One or more of the translation tables may include a clear indicator so that a processor accessing a corresponding block of memory can determine whether the block is in a cleared state, such that if the block needs to be cleared, the processor can avoid unnecessarily re-clearing the block.

The virtual address 300 includes fields or indexes to entries in translation tables in a hierarchy of translation tables. An exemplary virtual address 300 includes a region index (RX) 302, a segment index (SX) 304, a page index (PX) 306 and a byte index (BX) 308.

The virtual address 300 references entries in a region table, a page table and/or a byte table. A region table entry 310 includes a segment table origin field 312 that contains the address of a segment table entry 320, and additional fields such as a table offset (TF) field 314 indicating the offset (number of segments that are empty at the start of the segment table pointed to by the segment table origin field), a table type (TT) field 316 and a table length (TL) field 318 indicating the level and length of the table that contains the segment table entry.

The segment table entry 320 includes a page table origin field 322 that points to the table that this address uses, a page protection (P) bit 324 that indicates whether page protection applies to the segment associated with this entry, a common segment (C) bit 326 that controls use of the TLB, and a TT field 328. A page table entry 330 referenced by the segment table entry 320 includes a page frame real address 332 and a page protection (P) bit 334.

One or more of these tables, in one embodiment, includes a clear indicator or other information that indicates whether the referenced page has been cleared or is in a cleared state. For example, as shown in FIG. 3, the page table entry includes a clear indicator (CI) bit 336. The CI bit 336 may be set to a value (e.g., one) when the page is initially set up, and set to another value (e.g., zero) when data is stored to the page. Each time the page is cleared, the CI bit is set accordingly (e.g., to one) so that when a processor subsequently accesses the page, it can determine whether the page is in a cleared state before determining whether to clear the page.

As discussed above, a CPU or other processor uses the address 300 and stored information such as the tables 310, 320 and/or 330 to translate the address to a real address of an accessed or requested memory block. The processor may treat the address as a real address or a virtual address.

Figure 4:
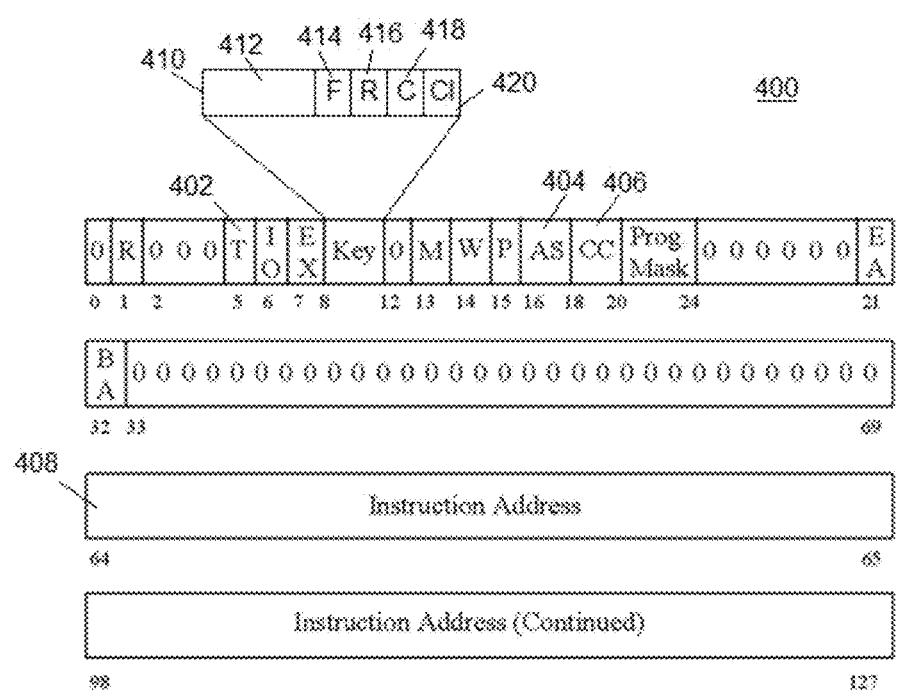
FIG. 4 depicts an embodiment of a program-status word used by a processor to execute instructions.

Another embodiment that incorporates a clear indicator is discussed in conjunction with FIG. 4, which shows an example of control information stored by a CPU or other processor to control execution of instructions and memory allocation functions. Control information may be loaded to the processor to a storage location such as a control register.

FIG. 4 shows an example of control information configured as a program status word (PSW) 400. The PSW is an area of memory or a hardware register which contains information about the program state used by an operating system and the underlying hardware. The PSW includes an instruction address, condition code, and other fields. In general, the PSW is used to control instruction sequencing and to hold and indicate the status of the system in relation to the program currently being executed. The active or controlling PSW is called the current PSW. By storing the current PSW during an interruption, the status of the CPU can be preserved for subsequent inspection. By loading a new PSW or part of a PSW, the state of the CPU can be initialized or changed.

The PSW 400 shown in FIG. 4 includes various fields and bits. A DAT Mode (T) bit 402 controls whether dynamic address translation (DAT) is used. When the bit 402 is zero, DAT is off and logical and instruction addresses are treated as real addresses. When the bit is one, DAT is on, and the dynamic address translation mechanism is invoked.

Other fields include an Address Space Control (AS) field 404 that is used in conjunction with the T bit 402 to control the translation mode. A Condition Code (CC) field 406 is set to a value of 0, 1, 2, or 3, depending on the result obtained in executing certain instructions. An Instruction Address field 408 designates the location of the leftmost byte of the next instruction to be executed.

A key (Key) field 410 forms an access key for storage references by the CPU. If the reference is subject to key controlled protection, a PSW key in the Key field 410 is matched with a storage key when information is stored or when information is fetched from a location that is protected against fetching. The Key field 410 is used to protect the main storage or other storage to control access to various memory blocks by users or tasks. The Key field 410 includes an access control field 412 including a storage key that is compared to access control bits in the memory block being referenced to determine whether the task accessing the memory block is allowed to access that storage. A Fetch protection (F) bit 414 indicates whether protection applies to fetch and/or store operations, a reference (R) bit 416 is associated with DAT, and a Change (C) bit 418 is set to one when information is stored in the corresponding memory block.

In one embodiment, a clear indicator is incorporated into the PSW to indicate whether a storage reference in the instruction refers to a memory block that has been cleared or is in a cleared state. In this example, the clear indicator is located as a bit referred to as a Clear Indicator (CI) bit 420 in the Key field, although the CI bit may be incorporated in other locations, fields or bit positions in the PSW.

It is noted that the fields and bit locations discussed herein are exemplary and non-limiting. The CI bit, clear indicator or other cleared state information may be included in any suitable location or field in the address, tables, table entries and PSW discussed above. In addition, the cleared state information may be stored in other locations and/or data structures used by a processor to manage and/or access memory.

In addition to the configurations described above, embodiments described herein may be incorporated into emulated computers and computer systems. Computer environments, including processors, memory, control units, interfaces, I/O subsystems and other components, may be virtualized. In addition, a computer or environment may be virtualized into multiple separate systems using, e.g., virtual machines.

Figure 5:
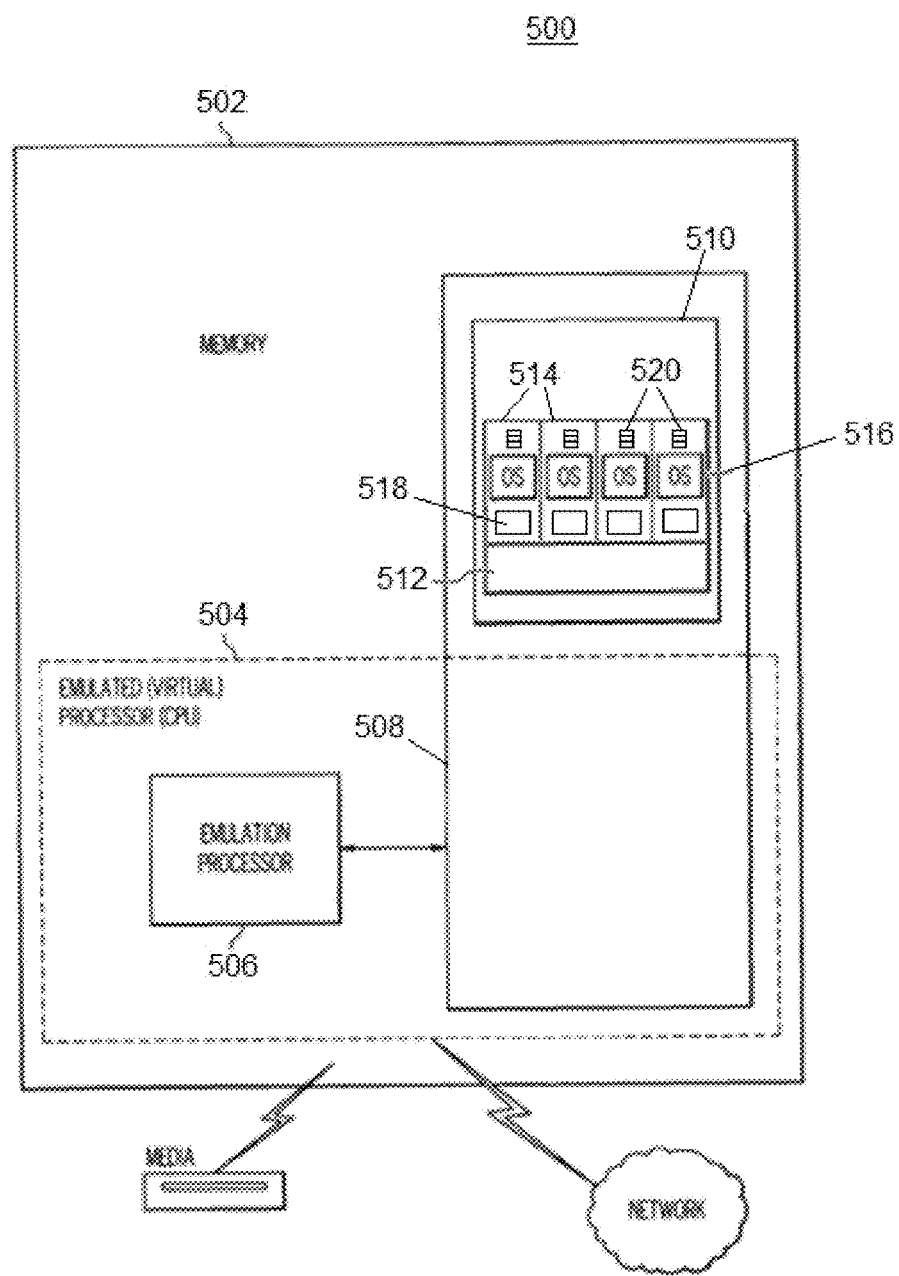
FIG. 5 depicts an embodiment of an emulated computer system.

FIG. 5 shows an example of an emulated (virtual) host computer system 500 that includes memory cleared state information. The system 500 emulates a host computer system 502 and includes an emulated host processor 504 that is realized through an emulation processor 506. Physical memory 508 is partitioned into host computer memory regions 510, also referred to in some instances as logical partitions (LPARs). Each region stores a hypervisor 512 and one or more virtual machines (VMs) 514, each of which runs a guest operating system 516 and various applications 518.

In one embodiment, each virtual machine has access to cleared memory information such as a clear indicator for each virtual memory block accessible by the virtual machine 514. For example, each VM 514 (or group of VMs) has access to a clear indicator table 520 that can be inspected by a VM prior to clearing a corresponding memory block or otherwise accessing or inspecting the memory block.

Figure 6:
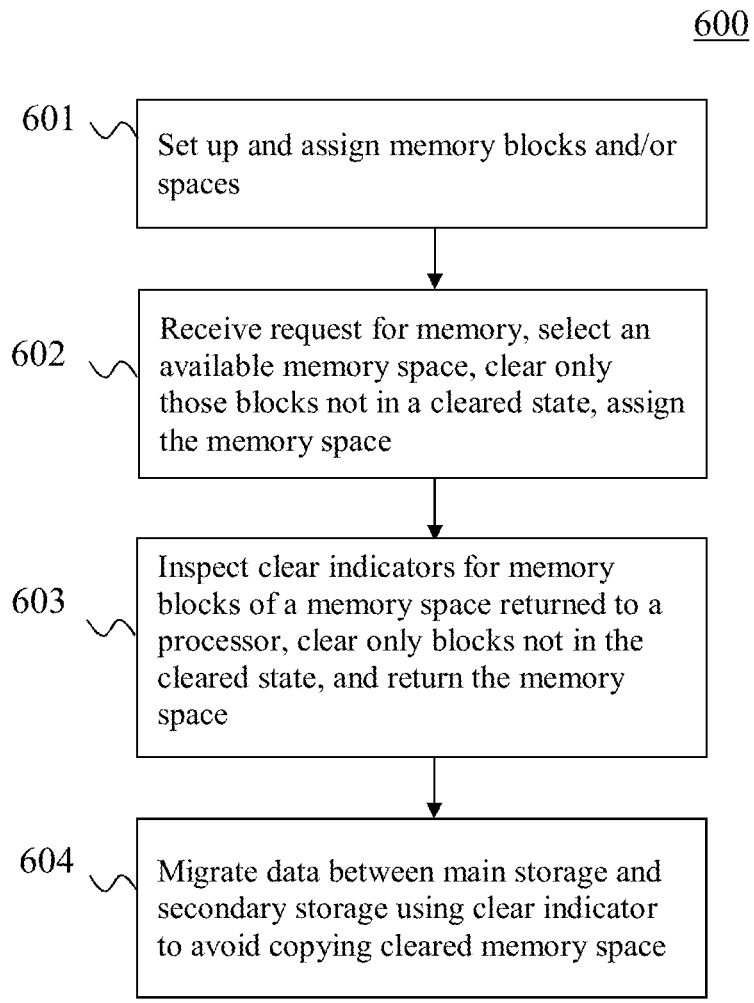
FIG. 6 is a flow diagram illustrating an embodiment of a method of processing data and managing memory by a processor.

FIG. 6 illustrates aspects of an embodiment of a method of processing data and managing memory by a processor. The method 600 may be performed by any suitable processor or computer system capable of accessing memory blocks or other memory locations. Exemplary processors include one or more components of the computer system 100, the processor 200 and/or the emulated computer system 500. In one embodiment, the method includes the steps represented by blocks 601-604 in the order described. However, in some embodiments, not all of the steps are performed and/or the steps are performed in a different order than that described.

At block 601, the processor sets up memory spaces and memory blocks, and assigns memory spaces and blocks to virtual and/or physical devices. For example, a CPU assigns memory blocks to different partitions, or a hypervisor assigns memory blocks to a virtual machine (VM). In one embodiment, the processor (e.g., for security purposes) ensures that memory blocks or spaces have been cleared of previously stored data before assigning such blocks or spaces.

As part of the set up process, the processor checks or inspects a clear indicator stored in a suitable location, such as a configuration array, metadata stored with individual memory blocks or spaces, and/or addressing tables. Based on the clear indicator, the processor determines whether each block or group of blocks is in a cleared state. An exemplary clear indicator is the CI bit 420.

If a memory block or space is in a cleared state, the processor assigns the block or blocks to a partition or VM without first clearing the memory block or space. If the memory block or space is not in a cleared state, the processor clears the memory block or space by setting all values to zero, and then sets the clear indicator to indicate that the memory block or space is now in a cleared state.

In one example, a VM has a number of partitions running thereon. The VM sets up a new partition using a base image containing a memory space (e.g., scratch space) to expedite setup. In setting up a new partition, the VM the VM inspects a clear indicator or other state information (e.g., the clear indicator table 520) to determine whether a portion of the base image represents cleared memory. If a portion of the memory is in a cleared state, the VM need only copy data to the new partition from portions of the memory that has not already been cleared, thus avoiding copying clear portions and avoiding unnecessary data movement operations for the cleared portions.

At block 602, the processor receives a request from a device for access to an amount of memory. In response, the processor selects an available memory space or group of memory blocks, and determines based on the clear indicator whether the available space or group of blocks is in a cleared state. The processor clears only the memory blocks or portions of the memory space that are not already in the cleared state, and assigns the memory space to the requesting device.

After the device finishes using the memory space, the device returns the memory space to the processor. Storage of data causes the clear indicator to indicate that the corresponding memory blocks have data stored therein, i.e., they are not in a cleared state.

At block 603, the processor, upon return of the memory space, inspects the clear indicator for each memory block, and clears only those blocks not in the cleared state before returning the memory blocks to make them available for further requests.

At block 604, the processor utilizes clear indicators to facilitate migrating data between a main memory and secondary memory (e.g., disks). If a memory space including multiple memory blocks (e.g., pages) needs to be transferred from disk, the processor (e.g., via an I/O controller or subsystem) checks clear indicators to determine whether any portion of the memory space is cleared. Only those pages that are not in a cleared state are paged out or read from the disk.

It is noted that the systems and methods utilizing knowledge of whether memory is already cleared are not limited to the specific embodiments described herein. The systems and methods may incorporate any technique to improve the performance of copying memory from one location to another or avoiding the movement of memory from one location to another, where the technique uses knowledge that some or all of the memory being moved is already zero or in a cleared state thus avoiding a move operation for some or all of the memory that is already zero.

An example of such an operation utilizing the cleared state information described herein includes encryption and compression techniques, whereby the cleared state indicator can be used to determine whether a memory space (or portion thereof) being encrypted or compressed is already zero. By making such a determination, a system processor can avoid subsequent fetch operations to the remainder of the memory block(s), continuing the encryption or compression operation on the existing cached portion of the memory block, given that the subsequent blocks have been determined to exist in the same cleared state.

Another example of an operation that can utilize the cleared state information described herein includes system paging operations to disk or storage, whereby the cleared state indicator can be used to determine whether a memory space (or portion thereof) being paged is already zero. At this point the operating system can make an active determination to reclaim the page space or avoiding the write out to disk for some or all of the memory that is already zero.

Technical effects and benefits of some embodiments include improvements in processor or computer functionality by, e.g., reducing the time and resources required to access or allocate a block of memory. For example, embodiments described herein produce benefits relative to prior art systems, such as reduced event latency, reduced system resource utilization, reduced system queuing and reduced system power use, as redundant operations can be avoided and cleared or zero-data movement cases could be optimized to reduce their visible effects.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a memory having computer readable instructions; and
    one or more processing devices for executing the computer readable instructions, the computer readable instructions comprising:
    receiving an instruction from a requesting device for access to an amount of memory;
    selecting a memory space in the memory corresponding to the amount of memory, the memory space including one or more memory blocks, each memory block of the one or more memory blocks having an address;
    inspecting a clear indicator associated with each memory block, the clear indicator stored as at least one bit in a field that is separate from contents of a respective memory block, the clear indicator indicating whether the respective memory block is in a cleared state, wherein the cleared state is a state of the respective memory block in which the respective memory block does not have any data stored therein;
    determining based on the clear indicator whether each memory block in the memory space is in the cleared state;
    based on determining that a first set of one or more memory blocks in the memory space is not in the cleared state while a second set of one or more memory blocks in the memory space is in the cleared state, clearing the memory space by clearing only the first set of one or more memory blocks;
    assigning the memory space to the requesting device;
    in response to the requesting device finishing its use of the memory space, accessing the clear indicator for each memory block and determining based on the clear indicator whether (1) each memory block in the memory space used by the requesting device is in the cleared state or (2) a third set of one or more memory blocks in the memory space is not in the cleared state while a fourth set of one or more memory blocks in the memory space is in the cleared state;
    based on determining that a third set of one or more memory blocks in the memory space used by the requesting device is not in the cleared state while a fourth set of one or more memory blocks in the memory space used by the requesting device is in the cleared state, clearing the memory space by clearing only the third set of one or more memory blocks; and
    making the memory space available for subsequent requests.

2. The system of claim 1, wherein determining based on the clear indicator whether each memory block is in the cleared state is performed without directly inspecting contents of the memory block.

3. The system of claim 1, wherein the field is located in a program status word (PSW), the PSW used to control execution of the instruction.

4. The system of claim 1, wherein the clear instruction is stored in a data structure used by the one or more processing devices to execute the instruction, and the data structure is selected from at least one of metadata associated with the memory block, a configuration table, a status table and an addressing table.

5. The system of claim 1, wherein the field is part of an address associated with the respective memory block.

6. The system of claim 1, wherein determining based on the clear indicator that the respective memory block associated with the clear indicator is in a cleared state includes at least one of preventing and eliminating the need for operations on the contents of said memory block to be completed.

7. The system of claim 1, wherein the field is part of a data structure selected from at least one of metadata associated with the memory block, a configuration table, a status table and an address.

8. The system of claim 1, wherein the field is part of an address associated with the respective memory block.

9. A computer program product comprising a computer readable storage medium having program instructions embodied therewith, the program instructions executable by a processing device to cause the processing device to perform a method comprising:

receiving an instruction at a processor from a requesting device for access to an amount of memory;

selecting a memory space in the memory corresponding to the amount of memory, the memory space including one or more memory blocks, each memory block of the one or more memory blocks having an address;

inspecting a clear indicator associated with each memory block, the clear indicator stored as at least one bit in a field that is separate from contents of a respective memory block, the clear indicator indicating whether the respective memory block is in a cleared state, wherein the cleared state is a state of the respective memory block in which the respective memory block does not have any data stored therein;

determining based on the clear indicator whether each memory block in the memory space is in the cleared state;

based on determining that a first set of one or more memory blocks in the memory space is not in the cleared state while a second set of one or more memory blocks in the memory space is in the cleared state, clearing the memory space by clearing only the first set of one or more memory blocks;

assigning the memory space to the requesting device;

in response to the requesting device finishing its use of the memory space, accessing the clear indicator for each memory block and determining based on the clear indicator whether (1) each memory block in the memory space used by the requesting device is in the cleared state or (2) a third set of one or more memory blocks in the memory space is not in the cleared state while a fourth set of one or more memory blocks in the memory space is in the cleared state;

based on determining that a third set of one or more memory blocks in the memory space used by the requesting device is not in the cleared state while a fourth set of one or more memory blocks in the memory space used by the requesting device is in the cleared state, clearing the memory space by clearing only the third set of one or more memory blocks; and making the memory space available for subsequent requests.

10. The computer program product of claim 9, wherein determining based on the clear indicator whether each memory block is in the cleared state is performed without directly inspecting contents of the memory block.

11. The computer program product of claim 9, the method further comprising:

based on determining that the respective memory block is in the cleared state, acquiring the memory block by the processor without clearing the memory block; and based on determining that the memory block is not in the cleared state, clearing the memory block and acquiring the memory block by the processor.

12. The computer program product of claim 9, wherein the memory space is an available memory space from one of a main memory and a secondary memory.

13. The computer program product of claim 9, wherein determining based on the clear indicator that the respective memory block associated with the clear indicator is in a cleared state includes at least one of preventing and eliminating the need for operations on the contents of said memory block to be completed.

14. The computer program product of claim 9, wherein the field is part of a data structure selected from at least one of metadata associated with the memory block, a configuration table, a status table and an address.

15. The computer program product of claim 9, wherein the field is located in a program status word (PSW), the PSW used to control execution of the instruction.

* * * * *